United States Patent
Katsuragawa et al.

(10) Patent No.: US 10,763,634 B2
(45) Date of Patent: Sep. 1, 2020

(54) LASER RESONATOR, AND METHOD OF DESIGNING LASER RESONATOR

(71) Applicant: The University of Electro-Communications, Tokyo (JP)

(72) Inventors: Masayuki Katsuragawa, Tokyo (JP); Chiaki Ooae, Tokyo (JP)

(73) Assignee: The University of Electro-Communications, Tokyo (JP)

( * ) Notice: Subject to any disclaimer, the term of this patent is extended or adjusted under 35 U.S.C. 154(b) by 0 days.

(21) Appl. No.: 16/411,572

(22) Filed: May 14, 2019

(65) Prior Publication Data

US 2019/0267769 A1    Aug. 29, 2019

Related U.S. Application Data

(63) Continuation of application No. PCT/JP2017/041126, filed on Nov. 15, 2017.

(30) Foreign Application Priority Data

Nov. 16, 2016  (JP) .................................. 2016-223000

(51) Int. Cl.
  *H01S 3/081* (2006.01)
  *H01S 3/08* (2006.01)
  *H01S 3/09* (2006.01)

(52) U.S. Cl.
  CPC ............ *H01S 3/0813* (2013.01); *H01S 3/081* (2013.01); *H01S 3/08018* (2013.01); *H01S 3/09* (2013.01)

(58) Field of Classification Search
  CPC ...... H01S 3/0813; H01S 3/0816; H01S 3/081; H01S 3/086; H01S 3/08018; H01S 3/09
  See application file for complete search history.

(56) References Cited

U.S. PATENT DOCUMENTS

| 5,412,683 | A | 5/1995 | Nighan, Jr. et al. |
| 5,701,203 | A | 12/1997 | Watanabe |
| 5,930,283 | A * | 7/1999 | Imai ........................ H01S 3/083 |
| | | | 372/75 |
| 2010/0014543 | A1 | 1/2010 | Ogilvy et al. |
| 2010/0091359 | A1 | 4/2010 | Yamamoto et al. |

(Continued)

FOREIGN PATENT DOCUMENTS

| JP | H08-222792 | 8/1996 |
| JP | H08-292306 | 11/1996 |

(Continued)

OTHER PUBLICATIONS

International Search Report for PCT/JP2017/041126 dated Jan. 23, 2018.

*Primary Examiner* — Armando Rodriguez

(74) *Attorney, Agent, or Firm* — IPUSA, PLLC

(57) ABSTRACT

A laser resonator includes a pair of optical elements forming a first optical path having a focused beam waist, one or more mirrors forming a second optical path of approximately parallel light connected to the first optical path, and a laser medium arranged in the second optical path. Induced emission light generated from the laser medium reciprocates or circles in a path formed by the first optical path and the second optical path. A distance between the pair of optical elements is adjustable, and a beam diameter at the second optical path is adjusted by adjusting the distance between the pair of optical elements.

17 Claims, 10 Drawing Sheets

(56) References Cited

U.S. PATENT DOCUMENTS

| | | | |
|---|---|---|---|
| 2014/0286364 A1 | 9/2014 | Pronin et al. | |
| 2015/0146750 A1* | 5/2015 | Miller | H01S 3/083 372/38.01 |
| 2015/0340833 A1 | 11/2015 | Pupeza et al. | |

FOREIGN PATENT DOCUMENTS

| | | | |
|---|---|---|---|
| JP | H09-036467 | | 2/1997 |
| JP | H09-508500 | | 8/1997 |
| JP | 9-36467 | * | 12/1997 |
| JP | H09-326516 | | 12/1997 |
| JP | 2005-217281 | | 8/2005 |
| JP | 2008-021798 | | 1/2008 |
| JP | 2008-034457 | | 2/2008 |
| JP | 2008-042061 | | 2/2008 |
| JP | 2009-031684 | | 2/2009 |
| JP | 2009-212405 | | 9/2009 |
| JP | 2011-066300 | | 3/2011 |
| JP | 2013-161609 | | 8/2013 |
| JP | 2014-531777 | | 11/2014 |
| JP | 2016-510505 | | 4/2016 |

* cited by examiner

LASER RESONATOR, AND METHOD OF DESIGNING LASER RESONATOR

CROSS-REFERENCE TO RELATED APPLICATIONS

This application is a continuation application of International Application No. PCT/JP2017/041126 filed on Nov. 15, 2017 and designated the U.S., which is based upon and claims priority to Japanese Patent Application No. 2016-223000, filed on Nov. 16, 2016, the entire contents of which are incorporated herein by reference.

BACKGROUND OF THE INVENTION

1. Field of the Invention

The present invention relates to a laser resonator, and a method of designing the laser resonator.

2. Description of the Related Art

Laser beams are used in various fields, such as optical communication, measurement of absorption and/or excitation spectrums, high-resolution measurement of matter and/or material, spectroscopy, and the like. An external cavity semiconductor laser that is highly selective and has a narrow oscillation spectral bandwidth is popularly used as a single longitudinal mode laser light source. The external cavity semiconductor laser includes a resonator arranged on an external side of an end surface covered by an anti-reflection (AR) coating that is made of a solid-state laser medium, and emits oscillation light tuned to a resonant wavelength of the resonator. The external resonator may have a known configuration in which a solid-state laser crystal is arranged in an optical path of a ring resonator formed using three mirrors, or a bow-tie resonator formed using four mirrors, to resonate oscillation light, as proposed in Japanese Laid-Open Patent Publication No. 2008-34457, for example.

When a high laser output is to be made, there is a problem in that optical elements or optical components forming the laser resonator may be damaged by high-intensity light. The problem of the optical elements or the optical components becoming damaged by the high-intensity light may be eliminated by increasing a beam diameter of the laser beam reciprocating or circling within the resonator, and decreasing the light intensity per unit area. However, when the beam diameter is increased, it becomes difficult to obtain a single transverse mode laser output having a uniform section intensity distribution.

SUMMARY OF THE INVENTION

One object of the embodiments of the present invention is to provide a laser resonator, and a method of designing the laser resonator, that can prevent optical damage to the resonator, and maintain the single transverse mode oscillation.

According to one aspect of the embodiments, a laser resonator includes a pair of optical elements forming a first optical path having a focused beam waist; one or more mirrors forming a second optical path of approximately parallel light connected to the first optical path; and a laser medium arranged in the second optical path, wherein induced emission light generated from the laser medium reciprocates or circles in a path formed by the first optical path and the second optical path, and wherein a distance between the pair of optical elements is adjustable, and a beam diameter at the second optical path is adjusted by adjusting the distance between the pair of optical elements.

According to another aspect of the embodiments, a laser resonator includes a pair of optical elements forming a first optical path having a focused beam waist; one or more mirrors forming a second optical path of approximately parallel light connected to the first optical path; and a laser medium arranged in the second optical path, wherein induced emission light generated from the laser medium reciprocates or circles in a path formed by the first optical path and the second optical path, and wherein an optical length of the first optical path is ten times or more the Rayleigh length prescribed by a beam diameter at the beam waist, and an optical length of the second optical path is two times or less the Rayleigh length prescribed by a beam diameter at the second optical path.

According to still another aspect of the embodiments, a method of designing a laser resonator, includes forming a laser resonator by a pair of optical elements forming a first optical path having a focused beam waist, and one or more mirrors forming a second optical path of approximately parallel light connected to the first optical path; arranging a laser medium in the second optical path; and adjusting a distance between the pair of optical elements to increase a beam diameter at the second optical path to a desired size.

Other objects and further features of the present invention will be apparent from the following detailed description when read in conjunction with the accompanying drawings.

DESCRIPTION OF THE PREFERRED EMBODIMENTS

Prior to illustrating a particular configuration of a laser resonator in one embodiment of the present invention, a problem encountered when a beam diameter of light reciprocating within the resonator is increased will be described. When the beam diameter is increased within the resonator, and particularly when the beam diameter is increased at a position where an optical element or an optical component is arranged, the problem of the optical element or the optical component within the resonator becoming damaged by high-intensity light can be eliminated. However, a condition that the oscillation light is a single transverse mode laser output needs to be satisfied. If the laser output is not the single transverse mode laser output, it not only becomes difficult to obtain the laser output having a uniform section intensity distribution, but also causes disadvantages from a viewpoint of application, such as difficulty encountered when focusing (or constricting) the laser output to the diffraction limit.

Figure 1:
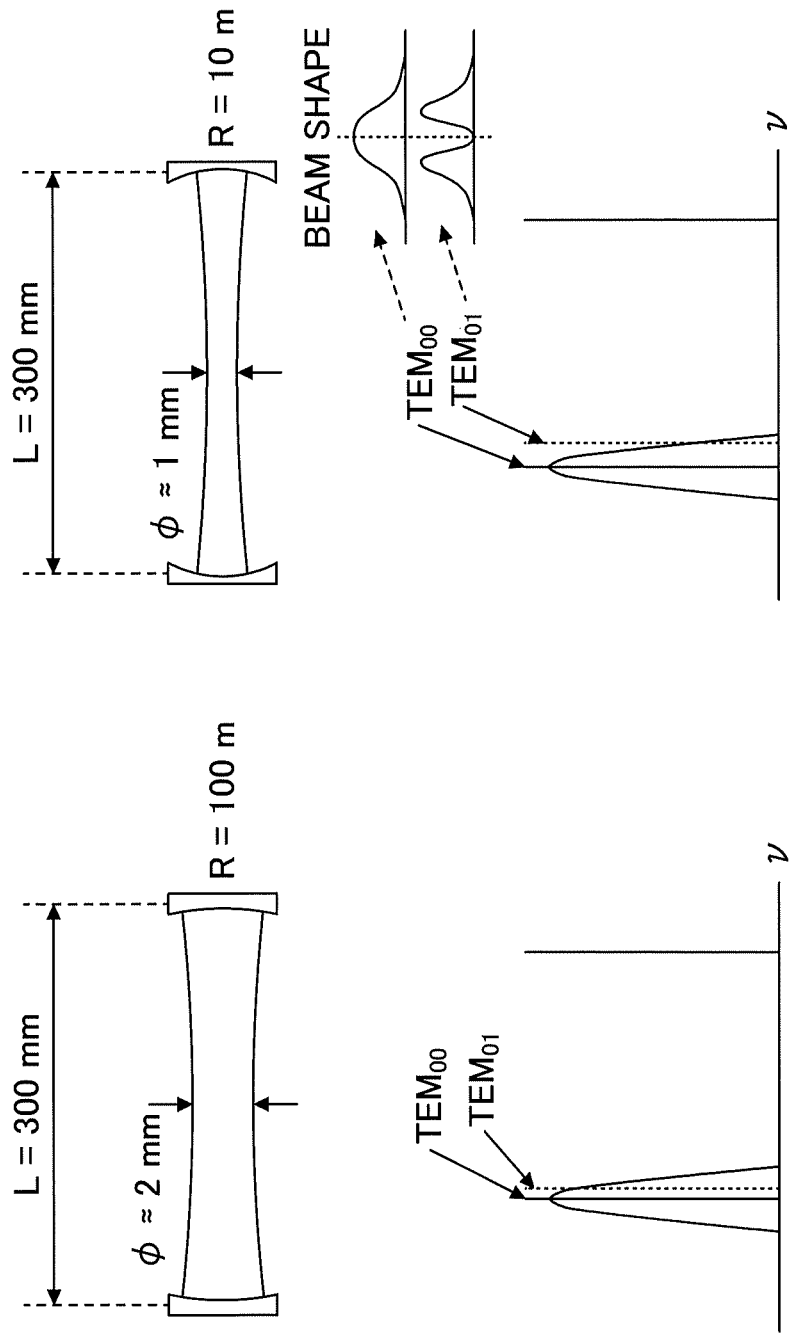
FIG. 1 is a diagram for explaining a problem encountered when a beam diameter is increased.

As illustrated in FIG. 1, one method of increasing the transverse mode beam diameter is to form the laser resonator using mirrors having a large radius of curvature. An example that uses a Fabry-Perot resonator will be described. As illustrated in a right portion of FIG. 1, in the Fabry-Perot resonator having a resonator interval $L_R$=300 mm, when a radius of curvature, R, of the mirrors forming the resonator is 10 m, a transverse mode beam diameter of a mode $TEM_{00}$ within the resonator becomes 1.0 mm to 1.1 mm. Hence, the laser output is approximately parallel light.

On the other hand, as illustrated in a left portion of FIG. 1, when the radius of curvature, R, of the mirrors having the same arrangement as that illustrated in the right portion of FIG. 1 is 100 m, the transverse mode beam diameter of the mode $TEM_{00}$ within the resonator becomes 2.0 mm to 2.1 mm. Compared to the mirrors having the radius of curvature, R=10 m, the mirrors having the radius of curvature, R=100 m, makes the beam diameter two time larger, and the cross sectional area of the beam four times larger. In this case, compared to the resonator in which R=10 m, the laser output with an energy that is four times higher can be obtained without encountering the problem of optical damage to the optical element or the optical component. The same applies to a case where the resonator has the configuration of the ring resonator.

It may appear as if the problem of the optical damage to the optical element or the optical component will be eliminated by the resonator having the configuration described above, however, this design would not actually function satisfactorily. One realistic problem is that manufacturing the mirror having such a large radius of curvature, R=100 m, is difficult. Further, even if such a mirror were manufactured, relatively large inconsistencies will be generated among the radii of curvature, R, of the individual mirrors that are manufactured, and it would be difficult to manufacture the mirrors having uniform dimensions stably conforming to specifications.

Another problem encountered is that, as illustrated in FIG. 1, a resonant frequency of high-order transverse mode (TEM: Transverse Electromagnetic Mode), particularly a mode $TEM_{01}$ or $TEM_{10}$ that is the high-order mode next to the mode $TEM_{00}$, becomes nearer to a fundamental mode frequency of the mode $TEM_{00}$ as the beam diameter becomes larger, to make it difficult to obtain the single transverse mode oscillation. Although it is conceivable to increase the finesse of the laser resonator and select the mode $TEM_{00}$ so that the single transverse mode oscillation is obtained, excessively increasing the finesse increases the light intensity within the resonator, to also generate the problem of the optical damage to the optical element or the optical component.

The present invention is conceived in view of the problem described above, to provide a laser resonator and a method of manufacturing the laser resonator that can eliminate the problem.

<Basic Configuration>

Figure 2:
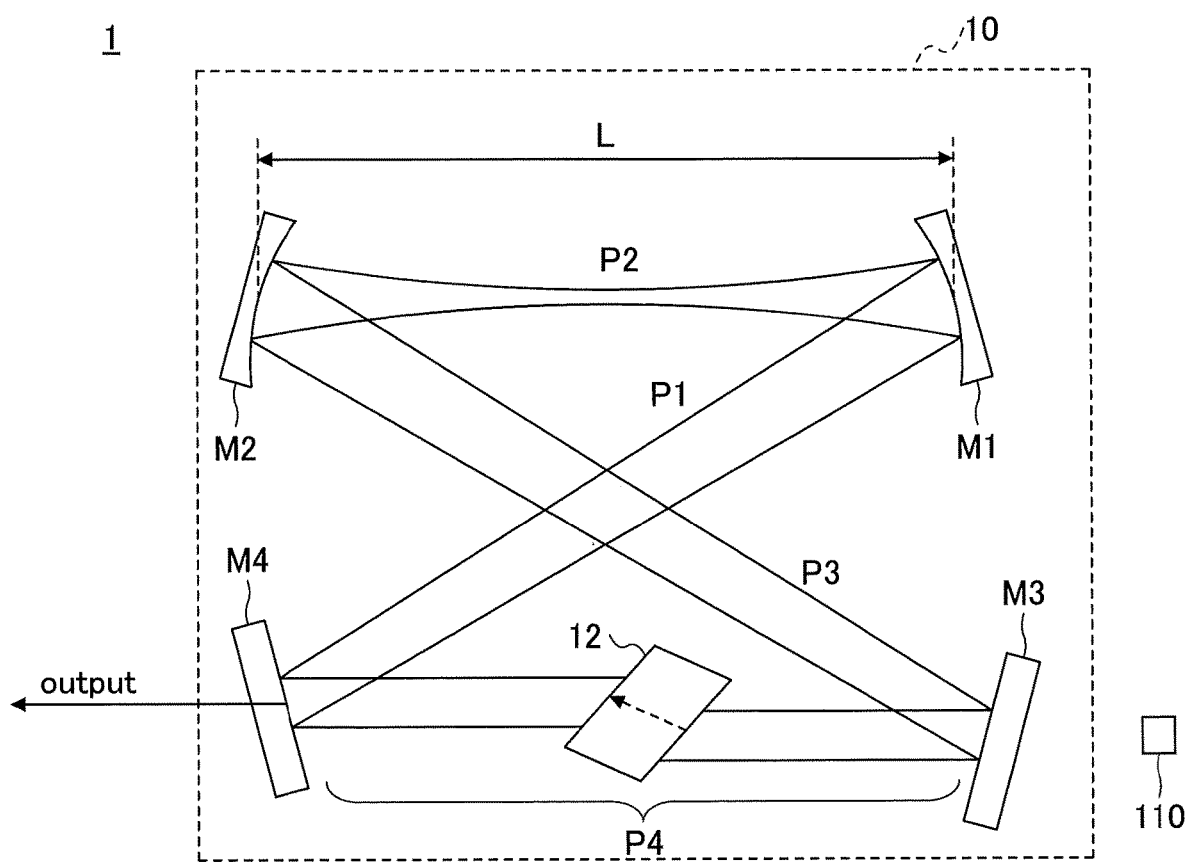
FIG. 2 is a diagram schematically illustrating a laser device in one embodiment.

FIG. 2 is a diagram schematically illustrating a laser device 1 in one embodiment. The laser device 1 includes an excitation light source 110, and a laser resonator 10.

The excitation light source 110 may be formed by any suitable light emitting element or device, including a laser diode, for example. The excitation light source 110 is arranged externally to the laser resonator 10, and emits excitation light that excites a laser medium 12 of the laser resonator 10. Although FIG. 2 illustrates an example in which the excitation light source 110 is located at a position on the right of the mirror M3, the location of the excitation light source 110 is not limited to the position illustrated in FIG. 2. The excitation light source 110 may be located at any suitable position capable of providing input light to the laser resonator 10.

The laser resonator 10 has an arrangement of the so-called bow-tie resonator, and includes four mirrors M1, M2, M3, and M4. The mirrors M1 and M2 are concave mirrors having predetermined radii of curvature. The mirrors M3 and M4 are planar mirrors. In this example, the concave mirror M1 has a radius of curvature, r1, that is 100 mm, and the concave mirror M2 has a radius of curvature, r2, that is 100 mm. However, the radius of curvature, r1, and the radius of curvature, r2, are not limited to these values, and may be set to arbitrary values suited for confining the beam diameter between the concave mirrors M1 and M2.

This mirror arrangement includes a first part where the beam diameter is tightly condensed, and a second part that may be regarded as parallel light. The first part has a path including a tightly focused (or constricted) beam waist, while the second part has a parallel light path. In the specification and claims, a term "approximately parallel light" does not include the tightly focused beam waist, and refers to what may be regarded as parallel light within the bounds of common sense to those skilled in the art of optics, as will be described later in conjunction with FIG. 3. The beam diameter is tightly focused between the concave mirrors M1 and M2, and the light is the approximately parallel light in paths other than between the concave mirrors M1 and M2, such as between the mirrors M2 and M3, between the mirrors M3 and M4, and between the mirrors M4 and M1. The laser medium 12 is arranged in a part where the light is the approximately parallel light.

In the path between the concave mirrors M1 and M2 where the beam waist is tightly focused, an optical path length is ten times or more the Rayleigh length prescribed by the beam diameter at the beam waist position. The Rayleigh length refers to a distance required until the beam diameter becomes √2 times, and is uniquely determined by the beam diameter. The beam diameter is small at the beam waist region between the concave mirrors M1 and M2, and an appropriate resonator arrangement is obtained by setting the optical length to ten times or more the Rayleigh length.

In the paths between the mirrors M2 and M3, between the mirrors M3 and M4, and between the mirrors M4 and M1, where the light becomes the approximately parallel light, a difference between the beam diameters at the beam waist region and the regions other than the beam waist region is small. The paths of the approximately parallel light may be set to an optical length that is two times or less the Rayleigh length determined by the beam diameter at the position where the beam diameter of the approximately parallel light becomes the smallest.

In the example illustrated in FIG. 2, the laser medium 12 is arranged between the mirrors M3 and M4, from a viewpoint of efficiently obtaining the laser output. However, the laser medium 12 may be arranged between the mirrors M1 and M4, or between the mirrors M2 and M3. A host material of the laser medium 12, added elements, composition, or the like may be appropriately selected based on a desired wavelength, absorptance with respect to excitation light, or the like. In this example, a titanium sapphire crystal having a refractive index of 1.76, and the Brewster's angle of 60.4°, is used for the laser medium 12.

In order to increase the amplification at the laser medium 12, the laser medium 12 is arranged at the tightly focused waist region according to a conventional configuration. On the other hand, in FIG. 2, the laser medium 12 is arranged at the part of the approximately parallel light, so that all of the optical elements or optical components, including the mirrors M1 through M4 and the laser medium 12, are arranged at the position where the beam diameter is large, and the problem of the optical damage to the optical element or the optical component by the high laser output can be avoided.

Figure 3:
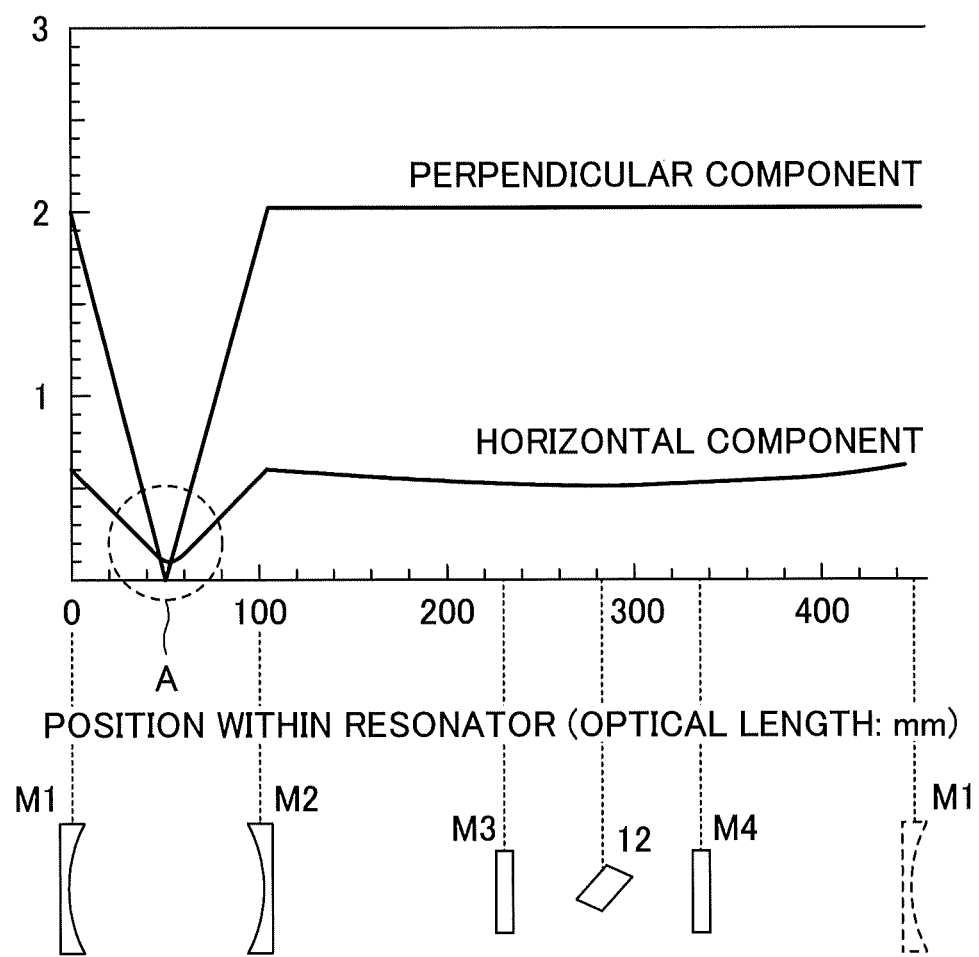
FIG. 3 is a diagram illustrating the beam diameter within a laser resonator having an arrangement of FIG. 2.

FIG. 3 is a diagram illustrating the beam diameter within the laser resonator 10 having the configuration illustrated in FIG. 2. In FIG. 3, the abscissa indicates a position within the laser resonator 10, more particularly, a distance (or optical length) from the mirror M1. For the sake of convenience, FIG. 3 illustrates, along the abscissa, the positions where the optical elements or the optical components are arranged within the laser resonator 10. In FIG. 3, the ordinate indicates the beam diameter (mm). In the arrangement used for experimentation, the distance between the concave mirrors M1 and M2 is 103.6 mm, the distance between the mirrors M2 and M3 is 130 mm, and the distance from the mirror M3 to an incidence plane of the titanium-sapphire crystal forming the laser medium 12 is 44 mm. A crystal length of the titanium-sapphire crystal is 17 mm (that is, the optical length is 29.9 mm), the distance from an outgoing plane of the titanium-sapphire crystal to the mirror M4 is 50.4 mm, and the distance between the mirrors M4 and M1 is 114 mm. The laser beam has an oval profile that has a different diameter between a component (horizontal component or meridional ray component) in a direction perpendicular to a traveling direction of the laser beam and parallel to a sheet surface of FIG. 2, and a component (perpendicular component or sagittal ray component) in a direction perpendicular to the traveling direction of the laser beam and perpendicular to the sheet surface. The different diameter of the oval profile of the laser beam is due to the effect of astigmatism caused by the use of the concave mirrors M1 and M2 having the curvature. As will be described later, the effect of the astigmatism may be corrected by use of an additional optical element or optical component.

As may be seen from FIG. 3, the beam diameter between the concave mirrors M1 and M2 is focused for both the perpendicular component and the horizontal component. In paths other than between the concave mirrors M1 and M2, the beam diameter is approximately 2 mm in the perpendicular direction that is perpendicular to the sheet surface, and the beam diameter is approximately 0.6 mm in the horizontal direction that is parallel to the sheet surface.

Figure 4:
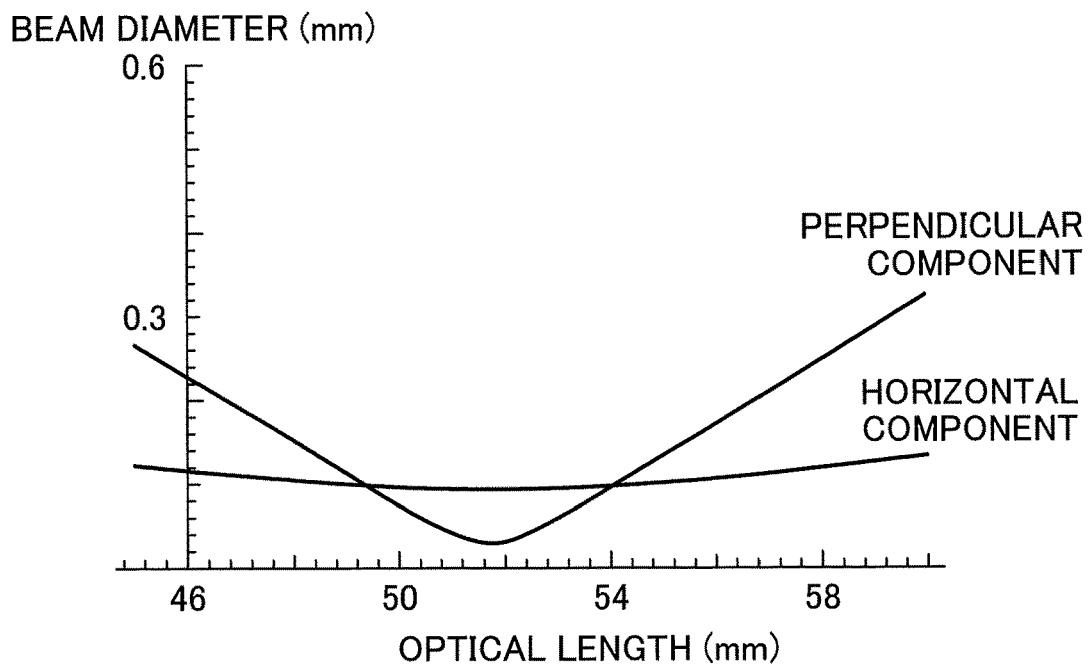
FIG. 4 is a diagram, on an enlarged scale, illustrating a tightly focused beam waist region of FIG. 3.

FIG. 4 is a diagram, on an enlarged scale, illustrating a tightly focused beam waist region A of FIG. 3. In this beam waist region A, the beam diameter of the perpendicular component is more tightly focused (or constricted) than the beam diameter of the horizontal component. The beam cross section becomes smallest at a center part of the concave mirrors M1 and M2, and the light confinement effect is large at this center part to increase the light intensity per unit area thereat. In the configuration illustrated in FIG. 2, no optical element nor optical component is arranged in a path P2 including the beam waist region A.

<Beam Diameter Adjustment by Adjustment of Distance Between Lenses>

The arrangement of FIG. 2 enables the beam diameter at the parallel light part to be variable while maintaining the single transverse mode oscillation, in addition to preventing the optical damage to the optical element or the optical component.

Figure 5:
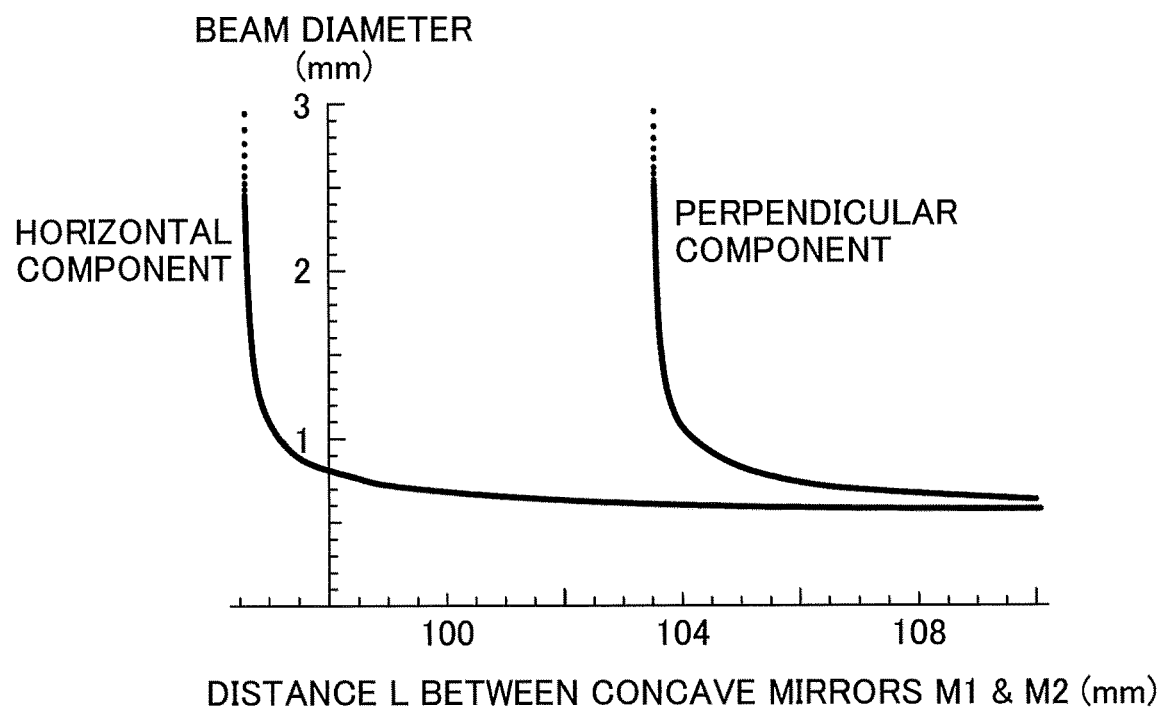
FIG. 5 is a diagram illustrating an example that enlarges the beam diameter to a desired size by adjusting a distance between concave mirrors M1 and M2 used in one embodiment.

FIG. 5 illustrates a change in the beam diameter when a distance L between concave mirrors M1 and M2 is varied. FIG. 5 illustrates the beam diameter of both the component (perpendicular component or sagittal ray component) in the direction perpendicular to the traveling direction of the laser beam and perpendicular to the sheet surface, and the component (horizontal component or meridional ray component) in the direction perpendicular to the traveling direction of the laser beam and parallel to the sheet surface. As may be seen from FIG. 5, by finely adjusting the distance L between the concave mirrors M1 and M2 having the curvature, it is possible to continuously increase the beam diameter at the part close to the parallel light, without varying the radius of curvature of the concave mirrors M1 and M2. For example, by setting the distance L between the concave mirrors M1 and M2 to 105 mm in the arrangement of FIG. 2, it is possible to obtain a beam profile that is close to a perfect circle (or round) and having a beam diameter of approximately 1 mm. By setting the distance L to 104 mm, it is possible to increase the beam diameter of the perpendicular component, to thereby increase the cross sectional area of the laser beam. The beam diameter of the horizontal component is uniquely determined, regardless of how the beam diameter of the perpendicular component is selected within a reasonable range. As an example, the beam diameter of the perpendicular component is set to 2 mm when the distance L is 103.6 mm. Even when the beam diameter of the perpendicular component is changed from 1 mm to 2 mm that is two times the original value, it is possible to fix the radius of curvature of the concave mirrors M1 and M2 to an actual value on the order of approximately 100 mm, for example. Accordingly, it is possible to easily acquire the concave mirrors M1 and M2 having uniform dimensions stably conforming to specifications.

In addition, the configuration illustrated in FIG. 2 exhibits good selectivity of the single transverse mode oscillation. The modes $TEM_{01}$ and $TEM_{10}$, that are the high-order modes next to the mode $TEM_{00}$, are located at positions approximately at the center of the longitudinal mode interval, and the mode $TEM_{00}$ can be selected so as to obtain the single transverse mode oscillation without increasing the finesse of the laser resonator 10. This is because the resonator arrangement forms the tightly focused waist within the laser resonator 10. In this specification, an arrangement, that determines the transverse mode profile within the laser resonator 10 by the stable oscillation using the light confinement effect, may also be referred to as a "stable resonator arrangement". According to the stable resonator arrangement, the beam diameter of the parallel light part can be increased using the reasonable radius of curvature of the concave mirrors M1 and M2, and a high laser output can be obtained in a state in which the frequency interval with respect to the adjacent high-order transverse modes is maintained to a sufficiently large frequency interval.

The even-numbered high-order transverse modes ($TEM_{02}$, $TEM_{20}$, or the like) are close to the mode $TEM_{00}$, however, spatial profiles of these even-numbered modes have a shape that spreads considerably toward the outside when compared to that of the mode $TEM_{00}$. Accordingly, the even-numbered modes can be eliminated sufficiently by matching the excitation light to the spatial profile of the $TEM_{00}$ mode, by arranging an aperture or the like within the laser resonator 10, or the like. The spatial profiles of the $TEM_{01}$ mode and the $TEM_{10}$ mode overlap the spatial profile of the $TEM_{00}$ mode to a large extent, and it is difficult to spatially distinguish the $TEM_{00}$ mode from the $TEM_{01}$ mode and the $TEM_{10}$ mode when compared to spatially distinguishing the $TEM_{00}$ mode from the $TEM_{00}$ mode and the $TEM_{20}$ mode, however, the above described configuration can maintain the sufficiently large frequency interval between the modes.

Figure 6:
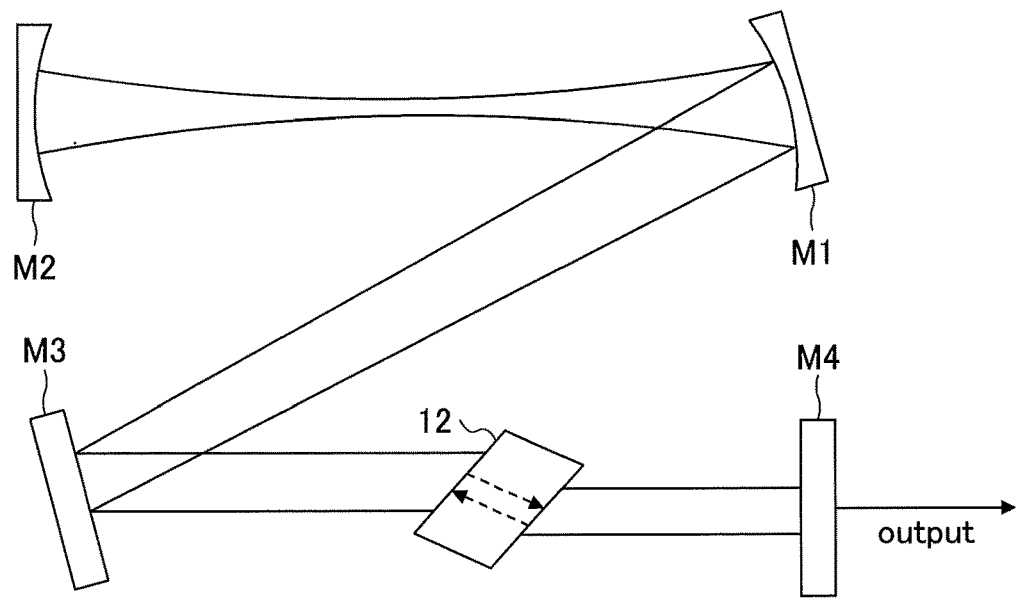
FIG. 6 is a diagram illustrating an example of an application to a Z-type resonator.

FIG. 6 is a diagram illustrating an example of an application to a standing-wave (Z-type) resonator, in place of the bow-tie resonator of FIG. 2. The above described effects of avoiding the optical damage to the optical element or the optical component, and adjusting the beam diameter by finely adjusting the distance L between the concave mirrors M1 and M2, can also be obtained by the Z-type resonator illustrated in FIG. 6. A laser resonator 10A illustrated in FIG. 6 includes the concave mirrors M1 and M2 having the curvature, and the planar mirrors M3 and M4. The laser medium 12 is inserted in the path of the parallel light, other than the path between the concave mirrors M1 and M2 where the laser beam is tightly focused. As an example, the laser medium 12 is inserted between the mirrors M3 and M4.

For example, the excitation light may be incoming from the side of the mirror M4, as in this example, however, the incoming position of the excitation light is not limited to the position of this example. The incoming excitation light excites the laser medium 12 to generate induced emission light. The excitation light is successively reflected by the mirror M3 and the concave mirror M1, and folds back at the concave mirror M2. The light reciprocates between the mirror M4 and the concave mirror M2. When the energy of light is sufficiently amplified, the light is output to the outside via the mirror M4.

According to the configuration illustrated in FIG. 6, the beam diameter at the parallel light part is increased, and the light intensity per unit area is reduced, by finely adjusting the distance L between the concave mirrors M1 and M2. The radii of curvature of the concave mirrors M1 and M2 are set to appropriate values so that the stable resonator arrangement is achieved.

First Modification

Figure 7:
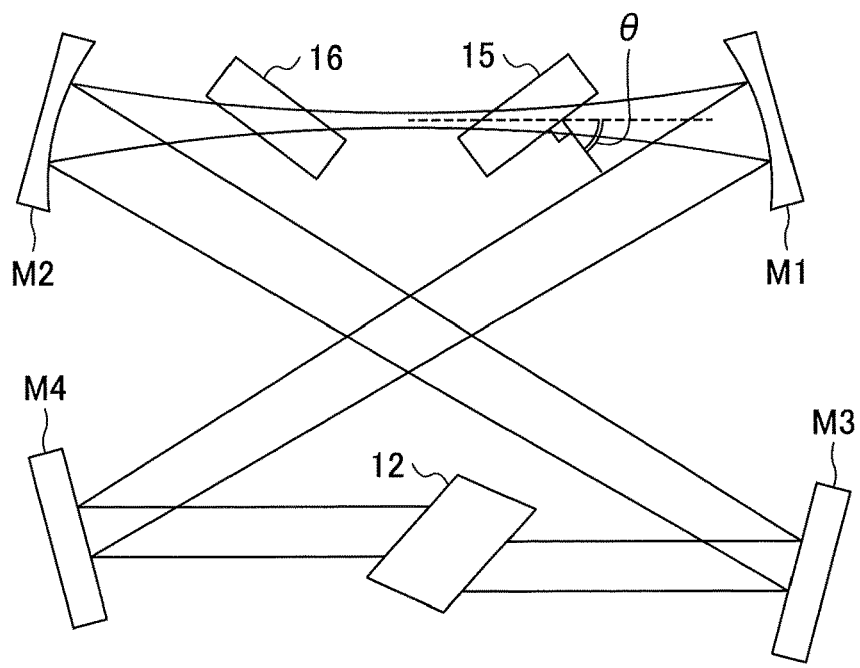
FIG. 7 is a diagram schematically illustrating the laser resonator in a first modification.

FIG. 7 is a diagram schematically illustrating a laser resonator 20 in a first modification. In FIG. 7, transparent plates 15 and 16, respectively satisfying a predetermined condition, are inserted in the path between the concave mirrors M1 and M2 having the curvature.

Generally, when spherical mirrors having curvature are used in the bow-tie or Z-type resonator arrangement, astigmatism occurs, the beam diameter becomes oval, and different beam divergences are generated along a major axis direction and a minor axis direction of the oval. Such different beam divergences may also be observed from FIG. 3 and FIG. 4. In order to reduce the effects of astigmatism, each of the transparent plates 15 and 16, forming an example of an astigmatism correction device or an astigmatism correction means, are inserted obliquely with respect to an optical axis. A correction amount of the astigmatism may be prescribed by a thickness t of the transparent plates 15 and 16, a refractive index of the transparent plates 15 and 16, and an angle of the transparent plates 15 and 16 with respect to the optical axis.

By setting an incident angle θ of the laser beam with respect to the transparent plates 15 and 16 to the Brewster's angle, it is possible to avoid a reflection loss caused by the insertion of the transparent plates 15 and 16. The incident angle θ is the Brewster's angle when the incident angle θ satisfies $\theta=\tan^{-1}(n_2/n_1)$, and the P-polarization is totally not reflected in this state, where $n_1$ denotes the refractive index of light in a medium (for example, air) prior to entering the transparent plates 15 and 16, and $n_2$ denotes the refractive index of light within the transparent plates 15 and 16. By setting the incident angle θ of the laser beam with respect to the transparent plates 15 and 16 to the Brewster's angle, it is possible to minimize a loss caused by surface reflection at the transparent plates 15 and 16, and reduce the effects of astigmatism caused by the use of the concave mirrors M1 and M2 having the curvature.

Second Modification

Figure 8:
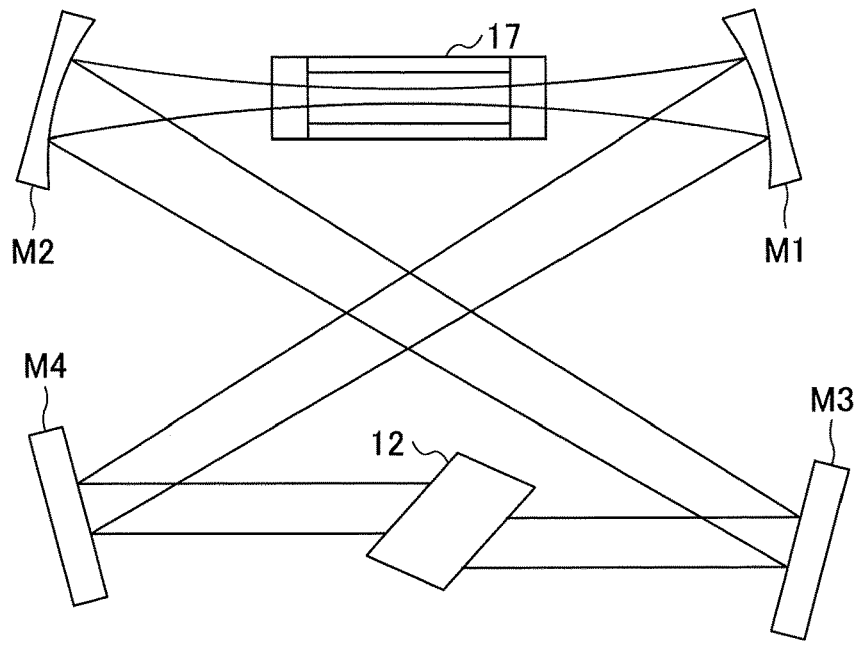
FIG. 8 is a diagram schematically illustrating the laser resonator in a second modification.

FIG. 8 is a diagram schematically illustrating a laser resonator 30 in a second modification. The configurations illustrated in FIG. 2 and FIG. 6 increases the light confinement effect by the concave mirrors M1 and M2 having the actual curvature, and also arranges the laser medium 12 in the parallel light path in which the beam diameter is large, to avoid the optical damage to the optical element or the optical component and simultaneously maintain the single transverse mode oscillation. However, the tightly focused beam waist is formed within the laser resonators 10 and 10A, and air discharge may be generated at the beam waist when the high laser output is to be obtained.

In the second modification, the beam waist region is arranged in a vacuum environment, to prevent the air discharge. The laser resonator 30 includes the concave mirrors M1 and M2 having the curvature, the planar mirrors M3 and M4, and a vacuum cell 17 arranged at the beam waist region. Similarly as in the case of the arrangements illustrated in FIG. 2, FIG. 6, and FIG. 7, the laser medium 12 is arranged in the optical path excluding the path of the beam waist (that is, the path between the concave mirrors M1 and M2). The entire laser resonator 30 may be arranged in a vacuum chamber. By arranging the vacuum cell 17 only at the beam waist region as illustrated in FIG. 8, the small size of the laser device 1 can be maintained.

Third Modification

Figure 9:
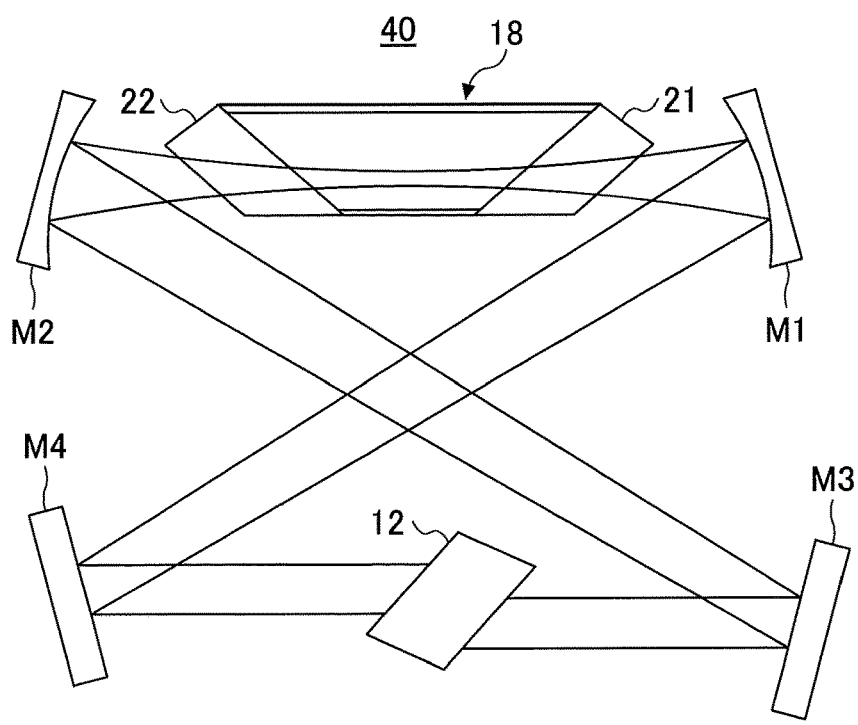
FIG. 9 is a diagram schematically illustrating the laser resonator in a third modification.

FIG. 9 is a diagram schematically illustrating a laser resonator 40 in a third modification. In the third modification, the vacuum cell of the second modification and the obliquely arranged transparent plates of the first modification are combined, to prevent both the astigmatism and the air discharge. The laser resonator 40 includes the concave mirrors M1 and M2 having the curvature, the planar mirrors M3 and M4, and a vacuum cell 18 arranged at the beam waist region. The vacuum cell 18 includes transparent plates 21 and 22, respectively arranged on an incidence side and an outgoing side, and inserted obliquely with respect to the optical axis. The transparent plates 21 and 22 reduces the astigmatism, and the vacuum cell 18 prevents the air discharge. By setting the angles of the transparent plates 21 and 22 that form optical windows of the vacuum cell 18 so as to satisfy the Brewster's condition, it is possible to prevent the reflection loss. Similarly as in the case of the arrangements illustrated in FIG. 2, FIG. 6, and FIG. 7, the laser medium 12 is arranged in the optical path excluding the path of the beam waist (that is, the path between the concave mirrors M1 and M2). According to the configuration illustrated in FIG. 9, it is possible to design a laser resonator that is simple and stable.

Figure 10:
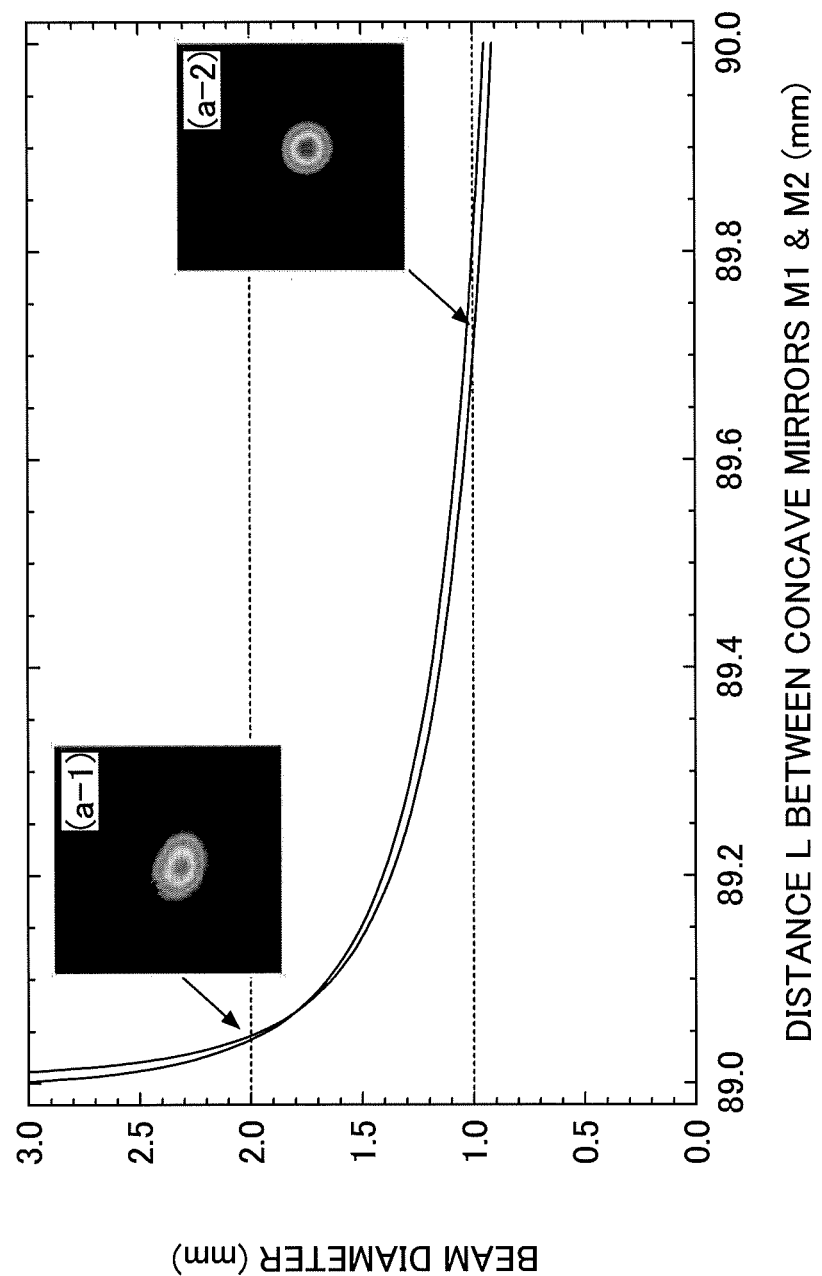
FIG. 10 is a diagram illustrating a beam diameter variation in an oscillation output according to the distance between the concave mirrors in an arrangement of FIG. 9.
Figure 11:
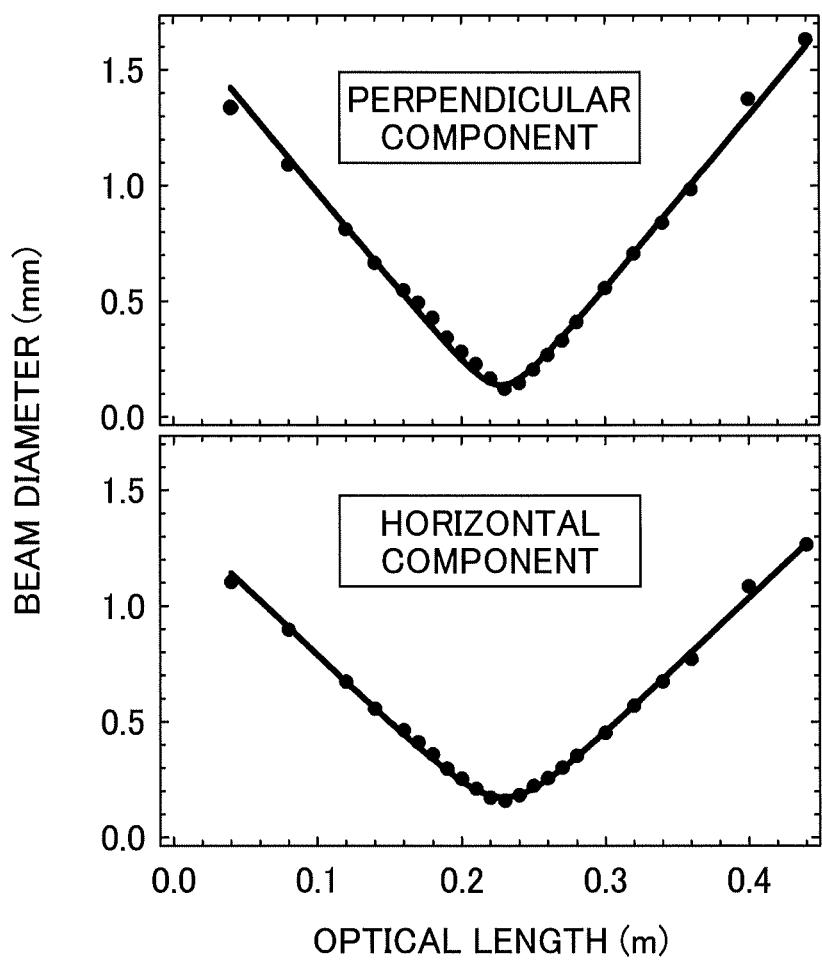
FIG. 11 is a diagram illustrating evaluation results of a beam quality of the oscillation output of FIG. 10.

FIG. 10 and FIG. 11 are diagrams illustrating properties of laser oscillation output light using the arrangement illustrated in FIG. 9. Injection-locked nanosecond pulse laser oscillation light is used as the laser oscillation output light. More particularly, external seed light is injected to the laser medium 12 made of titanium-sapphire illustrated in FIG. 9, to dominantly generate oscillation based on the seed light before spontaneous emission from the laser medium 12. As a result, the oscillation output becomes a stable output matching the longitudinal mode of the seed light.

In FIG. 10, the abscissa indicates the distance L (mm) between the concave mirrors M1 and M2, and the ordinate indicates the beam diameter (mm). In the state in which the vacuum cell 18, including the transparent plates 21 and 22, is inserted in the path between the concave mirrors M1 and M2 illustrated in FIG. 9, the distance (path length) L between the concave mirrors M1 and M2 is varied. The beam diameter of the oscillation output light varies with the variation of the distance L.

When the distance L between the concave mirrors M1 and M2 is 89.7 mm, the cross sectional shape of the laser beam is an approximate circle having a diameter of approximately 1 mm. An image (a-2) of the beam shape that is observed in this state is illustrated in FIG. 10. By varying the distance L between the concave mirrors M1 and M2 to 89.05 mm, the cross sectional shape of the laser beam becomes an approximate circle having a diameter of 2 mm. An image (a-1) of the beam shape that is observed in this latter state is also illustrated in FIG. 10.

In the laser resonator 40 illustrated in FIG. 9, the astigmatism is essentially eliminated by the transparent plates 21 and 22 inserted between the concave mirrors M1 and M2. Accordingly, two curves respectively representing the perpendicular component and the horizontal component in FIG. 10 are close to each other, and the cross sectional shape of the laser beam is maintained to the approximate circle, regardless of the variation in the distance L between the concave mirrors M1 and M2.

FIG. 11 is a diagram illustrating evaluation results of a beam quality (transverse mode) of the oscillation output having the beam shape corresponding to the image (a-1) in FIG. 10. The beam diameter was measured at a plurality of points along the optical axis from a focal point. An upper portion of FIG. 11 illustrates the properties of the perpendicular component (or sagittal ray component) perpendicular to the sheet surface, and a lower portion of FIG. 11 illustrates the horizontal component (or meridional ray component) parallel to the sheet surface. The beam quality is evaluated by the $M^2$ method. The $M^2$ value is an index representing how close the beam is to the single mode beam of the $TEM_{00}$ mode, and may be computed from the following formula, where $\lambda$ denotes a wavelength used, $w_0$ denotes a radius of the beam waist, and $\theta_0$ denotes a beam spread angle from the optical axis.

$$M^2 = (\pi/4\lambda) w_0 \times \theta_0$$

As a result of the computation, the $M^2$ value of both the perpendicular component and the horizontal component was approximately 1. This computation result of the $M^2$ value indicates that the laser beam is close to a single mode Gaussian beam.

Figure 12:
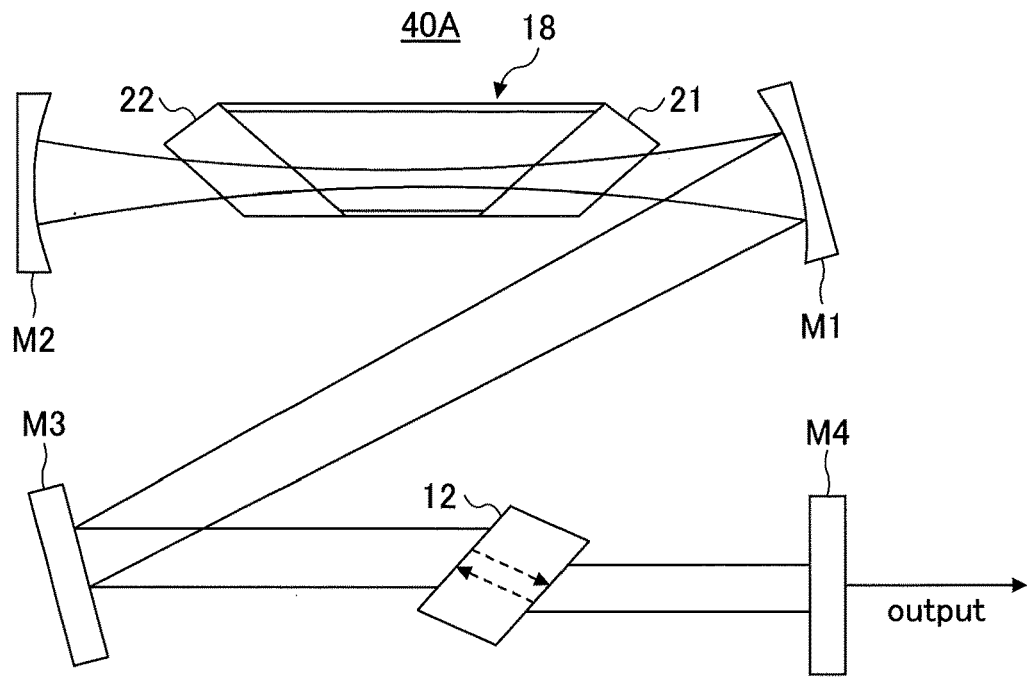
FIG. 12 is a diagram illustrating an example of an application of a configuration illustrated in FIG. 9 to the Z-type resonator.

FIG. 12 is a diagram illustrating an example of an application of the configuration illustrated in FIG. 9 to the standing-wave (Z-type) resonator. A laser resonator 40A includes the concave mirrors M1 and M2 having the curvature, the planar mirrors M3 and M4, and the vacuum cell 18 arranged at the beam waist region between the concave mirrors M1 and M2. The laser medium 12 is arranged in the parallel light path excluding the path where the laser beam is focused. The vacuum cell 18 includes the transparent plates 21 and 22, respectively arranged on the incidence side and the outgoing side, and inserted obliquely with respect to the optical axis, to thereby reduce the astigmatism and also prevent the air discharge. The angles of the transparent plates 21 and 22 with respect to the optical axis desirably satisfy the Brewster's condition.

Figure 13:
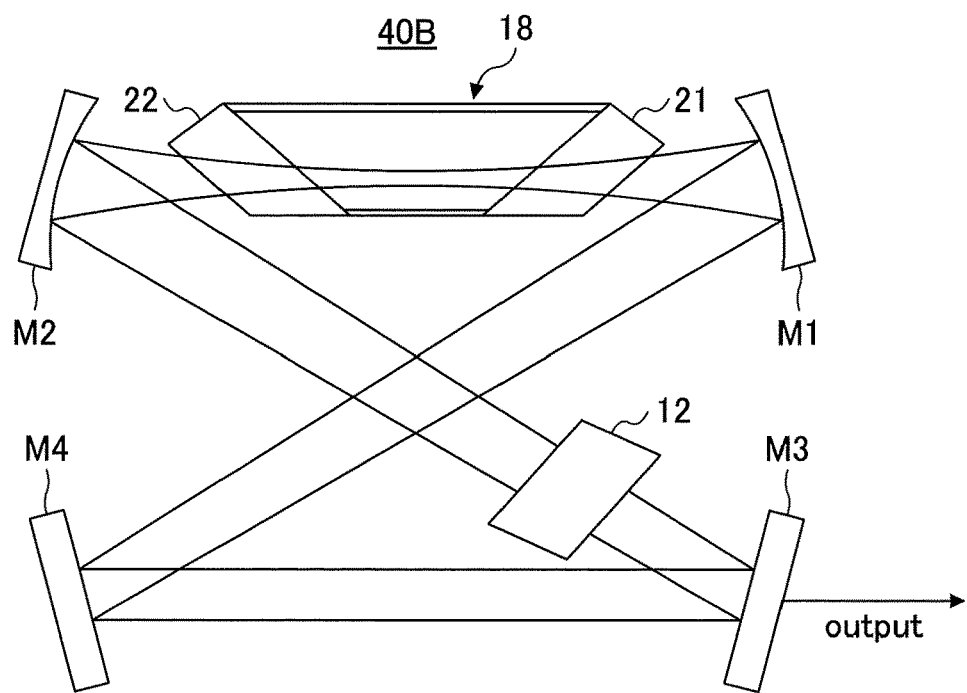
FIG. 13 is a diagram illustrating another example of a part where a laser medium is arranged.

FIG. 13 is a diagram illustrating another example of a part where the laser medium 12 is arranged. As described above, the laser medium 12 does not necessarily have to be arranged between the planar mirrors M3 and M4, as long as the laser medium 12 is inserted at the parallel light path avoiding the tightly focused beam waist region. In a laser resonator 40B illustrated in FIG. 13, the laser medium 12 is arranged between the concave mirror M2 and the planar mirror M3, however, the position of the laser medium 12 is not limited to the position of this example. For example, the laser medium 12 may be arranged between the concave mirror M1 and the planar mirror M4, for example. The selection of the arrangement position of the laser medium 12 may also be applied to the Z-type resonator arrangement of FIG. 12. In the example illustrated in FIG. 12, the laser medium 12 may be arranged between the concave mirror M1 and the planar mirror M3. By arranging the laser medium 12 in the path of the approximately parallel light, it is possible to prevent the optical damage to the optical element or the optical component in the single transverse mode oscillation of the stable resonator.

Fourth Modification

Figure 14:
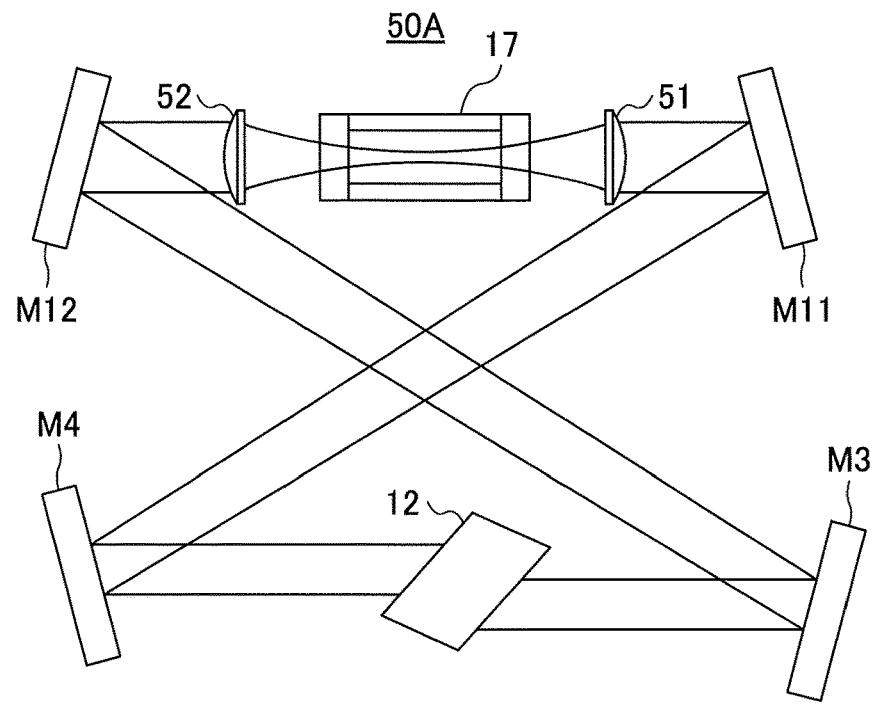
FIG. 14 is a diagram schematically illustrating the laser resonator in a fourth modification.

FIG. 14 is a diagram schematically illustrating a laser resonator 50A in a fourth modification. The laser resonator 50A uses a combination of a planar mirror M11 and a convex lens 51 in place of the concave mirror M1, and uses a combination of a planar mirror M12 and a convex lens 52 in place of the concave mirror M2. In the configuration of this example, the problem of astigmatism can be avoided because the laser beam becomes perpendicularly incident to the convex lenses 51 and 52, and it is unnecessary to insert the transparent plates 15 and 16 illustrated in FIG. 7 nor the transparent plates 21 and 22 illustrated in FIG. 9 in the optical path for the purposes of correcting the astigmatism. However, in a case where the air discharge near the tightly focused beam waist region may become a problem, it is desirable to arrange the vacuum cell 17 between the convex lens 51 and the convex lens 52. In this case, the convex lenses 51 and 52, and the optical windows of the vacuum cell 17 are desirably covered by the AR coating.

Figure 15:
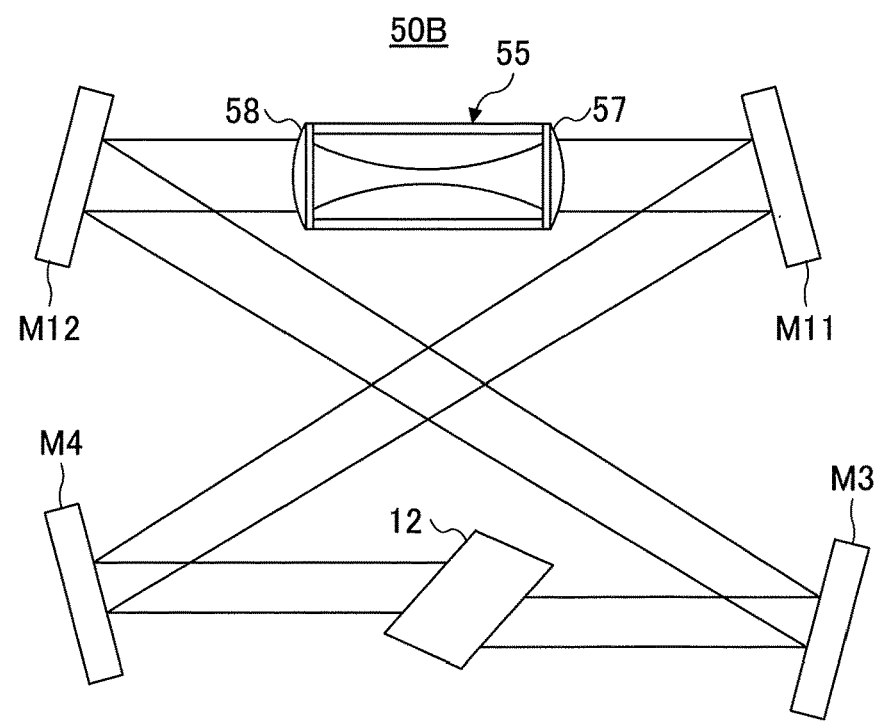
FIG. 15 is a diagram illustrating an example of another configuration of the fourth modification.

FIG. 15 is a diagram illustrating an example of another configuration of the fourth modification. A laser resonator 50B illustrated in FIG. 15 includes a vacuum cell 55, and convex lenses 57 and 58 respectively forming an incidence plane and an outgoing plane of the vacuum cell 55. The number of elements or components that are required can be reduced according to this configuration, and both the astigmatism and the air discharge can be prevented.

In the examples illustrated in FIG. 14 and FIG. 15, the laser medium 12 is arranged between the planar mirrors M3 and M4, however, the laser medium 12 may be arranged in another parallel light path, as illustrated in FIG. 13.

As described heretofore, according to each of the embodiments and the modifications, the optical damage to the optical element or the optical component within the laser resonator, even when the laser output is increased, and stable oscillation can be obtained in the single transverse mode without increasing the finesse of the laser resonator.

Any of the laser resonators illustrated in FIG. 2 and in accordance with the first through fourth modifications may be combined with an external excitation light source, to form the laser device 1. By injecting the excitation light from the external excitation light source to the laser medium 12, the laser medium 12 can be excited to generate the laser oscillation. Such a laser device also falls within the scope of the present invention.

Hence, according to the embodiments and the modifications described above, it is possible to provide a laser resonator, and a method of designing the laser resonator, that can prevent optical damage to the laser resonator, and maintain the single transverse mode oscillation.

Although the modifications are numbered with, for example, "first," "second," "third," or "fourth," the ordinal numbers do not imply priorities of the modifications.

The present invention is not limited to the embodiments described above. In other words, it is apparent to those skilled in the art that various variations, combinations, sub-combinations, and substitutions may be made to the structures of the embodiments described above without departing from the scope of the present invention.

What is claimed is:

1. A laser resonator comprising:
    a pair of optical elements forming a first optical path having a focused beam waist;
    one or more mirrors forming a second optical path of approximately parallel light connected to the first optical path; and
    a laser medium arranged in the second optical path,
    wherein induced emission light generated from the laser medium reciprocates or circles in a path formed by the first optical path and the second optical path, and
    wherein a distance between the pair of optical elements is adjustable, and a beam diameter at the second optical path is adjusted by adjusting the distance between the pair of optical elements.

2. The laser resonator as claimed in claim 1, wherein the beam waist of the first optical path is arranged in a vacuum environment.

3. The laser resonator as claimed in claim 2, further comprising:
    a vacuum cell arranged at the beam waist of the first optical path.

4. The laser resonator as claimed in claim 3, wherein the vacuum cell includes a transparent plate having a predetermined thickness and arranged obliquely with respect an optical axis of the first optical path at an angle satisfying the Brewster's angle.

5. The laser resonator as claimed in claim 1, further comprising:
    an astigmatism correction device arranged in the first optical path.

6. The laser resonator as claimed in claim 1, wherein
    the pair of optical elements include a first concave mirror and a second concave mirror respectively having a predetermined radius of curvature, and
    the one or more mirrors include one or more planar mirrors.

7. The laser resonator as claimed in claim 1, wherein the pair of optical elements include a pair of convex lenses.

8. A laser device comprising:
    a laser resonator according to claim 1; and
    an excitation light source, arranged externally to the laser resonator, and configured to emit excitation light that excites the laser medium of the laser resonator.

9. A laser resonator comprising:
    a pair of optical elements forming a first optical path having a focused beam waist;
    one or more mirrors forming a second optical path of approximately parallel light connected to the first optical path; and
    a laser medium arranged in the second optical path,
    wherein induced emission light generated from the laser medium reciprocates or circles in a path formed by the first optical path and the second optical path, and
    wherein an optical length of the first optical path is ten times or more the Rayleigh length prescribed by a beam diameter at the beam waist, and an optical length of the second optical path is two times or less the Rayleigh length prescribed by a beam diameter at the second optical path.

10. The laser resonator as claimed in claim 9, wherein the beam waist of the first optical path is arranged in a vacuum environment.

11. The laser resonator as claimed in claim 10, further comprising:
    a vacuum cell arranged at the beam waist of the first optical path.

12. The laser resonator as claimed in claim 11, wherein the vacuum cell includes a transparent plate having a predetermined thickness and arranged obliquely with respect an optical axis of the first optical path at an angle satisfying the Brewster's angle.

13. The laser resonator as claimed in claim 9, further comprising:
    an astigmatism correction device arranged in the first optical path.

14. The laser resonator as claimed in claim 9, wherein
    the pair of optical elements include a first concave mirror and a second concave mirror respectively having a predetermined radius of curvature, and
    the one or more mirrors include one or more planar mirrors.

15. The laser resonator as claimed in claim 9, wherein the pair of optical elements include a pair of convex lenses.

16. A laser device comprising:
    a laser resonator according to claim 9; and
    an excitation light source, arranged externally to the laser resonator, and configured to emit excitation light that excites the laser medium of the laser resonator.

17. A method of designing a laser resonator, comprising:
forming a laser resonator by a pair of optical elements forming a first optical path having a focused beam waist, and one or more mirrors forming a second optical path of approximately parallel light connected to the first optical path;
arranging a laser medium in the second optical path; and
adjusting a distance between the pair of optical elements to increase a beam diameter at the second optical path to a desired size.

* * * * *